(12) United States Patent
Miyahara

(10) Patent No.: US 8,982,398 B2
(45) Date of Patent: Mar. 17, 2015

(54) IMAGE FORMING APPARATUS THAT ALLOWS FOR A MULTI-OPERATION

(71) Applicant: KYOCERA Document Solutions Inc., Osaka (JP)

(72) Inventor: Norifumi Miyahara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/083,588

(22) Filed: Nov. 19, 2013

(65) Prior Publication Data

US 2014/0139879 A1 May 22, 2014

(30) Foreign Application Priority Data

Nov. 22, 2012 (JP) .................. 2012-256681

(51) Int. Cl.
G06K 15/00 (2006.01)
G06F 3/12 (2006.01)
H04N 1/32 (2006.01)

(52) U.S. Cl.
CPC .......... G06F 3/1218 (2013.01); H04N 1/32561 (2013.01)
USPC ................. 358/1.15; 358/1.16; 358/1.17

(58) Field of Classification Search
CPC .................. G06F 3/1218; H04N 1/32561
See application file for complete search history.

(56) References Cited

U.S. PATENT DOCUMENTS

2012/0297398 A1* 11/2012 Inoue et al. .................. 718/108

FOREIGN PATENT DOCUMENTS

| JP | 2005-004348 | 1/2005 |
| JP | 2007-241912 | 9/2007 |

* cited by examiner

Primary Examiner — Saeid Ebrahimi Dehkordy
Assistant Examiner — Lennin RodriguezGonzale
(74) Attorney, Agent, or Firm — McDonnell Boehnen Hulbert & Berghoff LLP

(57) ABSTRACT

Modules include ASIC modules for printing and ASIC modules for the scanner. A permission time slot, in which a bus request for inter-buffer memory data transfer is permitted, is allocated to each of a first module group including the ASIC modules for printing and a second module group including the ASIC modules for the scanner, in each of a first multi-operation in which print and image scan functions are operated in parallel and a second multi-operation in which copy and image scan functions are operated in parallel. The permission time slot is defined so that a value obtained by dividing the permission time slot allocated to the first module group by the permission time slot allocated to the second module group is larger in the first multi-operation than in the second multi-operation.

17 Claims, 7 Drawing Sheets

FIRST MODULE GROUP

| ID | TRANSFER SOURCE MODULE NAME | TRANSFER DESTINATION MODULE NAME |
|----|------|------|
| 1 | MPU I/F | PE I/F |
| 2 | BM | ROT |
| 3 | ROT | CP1 |
| 4 | CP1 | CP2 |
| 5 | CP2 | CP3 |
| 6 | CP3 | MPU I/F |

FIG. 3A

SECOND MODULE GROUP

| ID | TRANSFER SOURCE MODULE NAME | TRANSFER DESTINATION MODULE NAME |
|----|------|------|
| 10 | SCAN I/F | HT |
| 11 | HT | JPEGC |
| 12 | JPEGC | MPU I/F |
| 13 | MPU I/F | JPEGD |
| 14 | JPEGD | CP4 |
| 15 | CP4 | MPU I/F |

FIG. 3B

HEDDER ADDRESS

| ID | TRANSFER SOURCE BUFFER ADDRESS | TRANSFER DESTINATION BUFFER ADDRESS |
|----|------|------|
| 1 | SA1 | DA1 |
| 2 | SA2 | DA2 |
| ⋮ | ⋮ | ⋮ |
| 14 | SA14 | DA14 |
| 15 | SA15 | DA15 |

FIG. 3C

| ID | PRIORITY |
|----|------|
| 1 | 1 |
| 2 | 2 |
| 3 | 3 |
| 4 | 3 |
| 5 | 3 |
| 6 | 3 |

FIG. 3D

| ID | PRIORITY |
|----|------|
| 10 | 1 |
| 11 | 2 |
| 12 | 3 |
| 13 | 3 |
| 14 | 3 |
| 15 | 3 |

IMAGE FORMING APPARATUS THAT ALLOWS FOR A MULTI-OPERATION

INCORPORATION BY REFERENCE

This application is based upon, and claims the benefit of priority from, corresponding Japanese Patent Application No. 2012-256681, filed in the Japan Patent Office on Nov. 22, 2012, the entire contents of which are incorporated herein by reference.

FIELD

Unless otherwise indicated herein, the description in this background section is not prior art to the claims in this application and is not admitted to be prior art by inclusion in this section. The present disclosure generally relates to an image forming apparatus including a print engine, a scanner, a processor, a plurality of co-processors for a print image process, and a plurality of co-processors for a scanned image process.

BACKGROUND

In a copy function of a typical image forming apparatus, an image scanned by a scanner is processed and supplied to a print engine. Accordingly, a scanned image processing unit that processes the image scanned by the scanner and a print image processing unit that performs image process and supplies the processed image to the print engine cooperate with each other. The scanned image processing unit and the print image processing unit are coupled to each other via a bus.

In such a hardware configuration, when a multi-operation such as performing printing during scanning is performed, bus usage may rise in the scanned image processing unit. Therefore, data to be supplied to the print engine may be delayed, which may cause an abnormality in an image to be printed.

To address this issue, a bus bandwidth may be enhanced by widening the bus or by enhancing a clock frequency that controls the rate at which data may be transferred on the bus. However, increasing a bus bandwidth or enhancing a clock frequency may cause an increase in cost of the image forming apparatus.

SUMMARY

The present disclosure generally relates to an image forming apparatus that provides for multi-operation functionality without enhancing a bus bandwidth.

An image forming apparatus according to an embodiment of the present disclosure includes a print engine; a scanner; a processor; a bus; and a plurality of modules coupled to the bus. Respective modules of the plurality of modules comprise a buffer memory. The image forming apparatus also includes an arbitration circuit that permits any one of the plurality of modules to use the bus in response to a bus request received from the plurality of modules; an input device; and a main controller.

The plurality of modules include a plurality of ASIC modules for printing that function as co-processors for the processor; a plurality of ASIC modules for the scanner that function as co-processors for the processor; and a processor interface module that is coupled to the processor and functions as a transfer buffer between the processor and the bus.

The plurality of ASIC modules for printing includes a print engine interface module that functions as a transfer buffer between the processor interface module and the print engine.

The plurality of ASIC modules for the scanner includes a scanner interface module that functions as a transfer buffer between the scanner and one image processing module among the plurality of ASIC modules for the scanner.

The main controller operates one of a print function, a copy function, and an image scan function in response to an input through the input device, and one of the plurality of ASIC modules for printing and the plurality of ASIC modules for the scanner operate in accordance with the operated one of the print function, the copy function, and the image scan function.

The arbitration circuit is configured to determine inter-buffer memory data transfer from one of two modules among the plurality of modules to another of the two modules as permitted data transfer based on a priority set therefor.

The arbitration circuit is also configured to allocate a permission time slot, in which the bus request for the inter-buffer memory data transfer is permitted, to each of a first module group including the processor interface module and the plurality of ASIC modules for printing and a second module group including the processor interface module and the plurality of ASIC modules for the scanner, in each of a first multi-operation in which the print function and the image scan function are operated in parallel and a second multi-operation in which the copy function and the image scan function are operated in parallel.

The arbitration circuit is additionally configured to alternately set the permission time slot allocated to the first module group and the permission time slot allocated to the second module group in one of the first multi-operation and the second multi-operation.

The arbitration circuit is further configured to permit the bus request for the inter-buffer memory data transfer within the first module group in the permission time slot allocated to the first module group, and permit the bus request for the inter-buffer memory data transfer within the second module group in the permission time slot allocated to the second module group, The permission time slot are defined so that a value obtained by dividing the permission time slot allocated to the first module group by the permission time slot allocated to the second module group becomes larger in the first multi-operation than in the second multi-operation.

Additional features and advantages are described herein, and will be apparent from the following Detailed Description and the figures.

BRIEF DESCRIPTION OF THE FIGURES

In the accompanying drawings:

FIG. 3A is a tabular diagram illustrating a transfer source module name and a transfer destination module name for each inter-module transfer ID of a first module group (modules relating to print image process);

FIG. 3B is a tabular diagram illustrating a transfer source module name and a transfer destination module name for each inter-module transfer ID of a second module group (modules relating to scanned image process);

FIG. 3C is a tabular diagram illustrating a transfer source buffer address and a transfer destination buffer address for each inter-module transfer ID;

FIG. 3D is a tabular diagram illustrating a priority of the inter-module transfer ID within the first module group;

FIG. 3E is a tabular diagram illustrating a priority of the inter-module transfer ID within the second module group;

DETAILED DESCRIPTION

Figure 1:
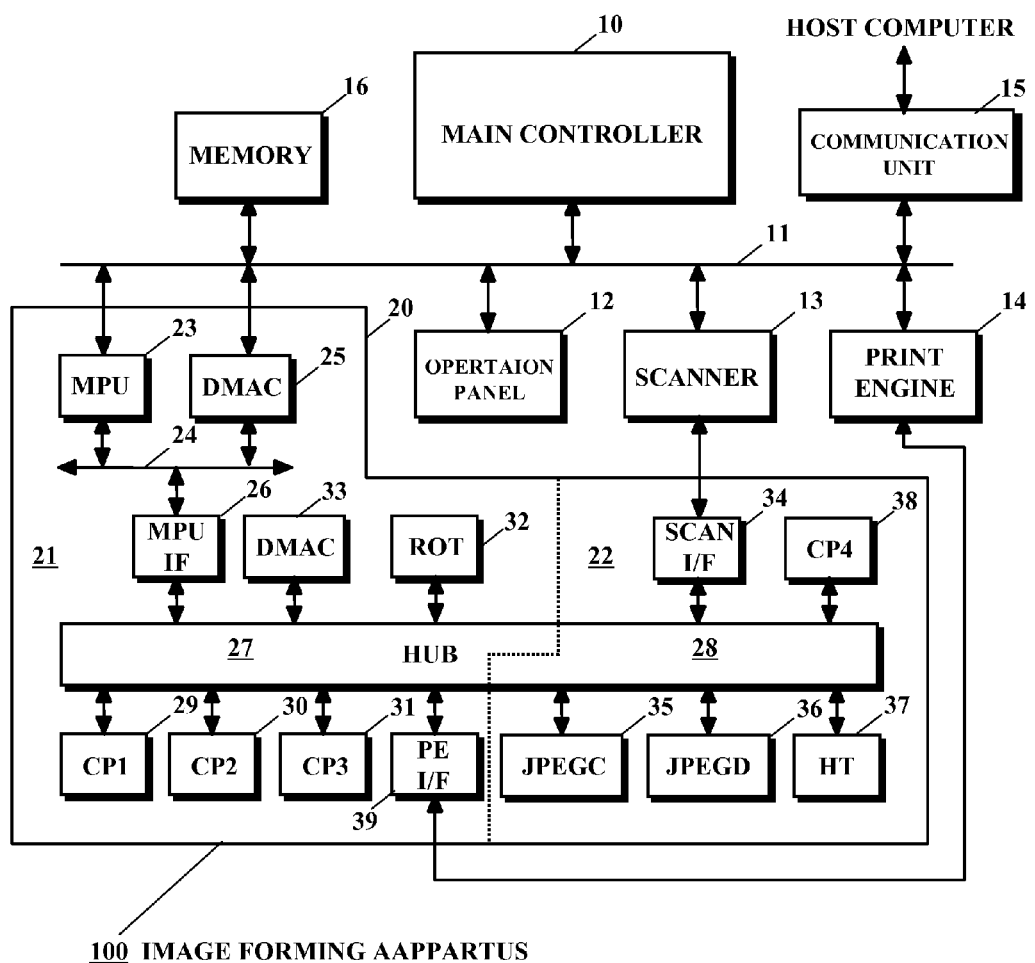
FIG. 1 is a block diagram illustrating a hardware configuration of an image forming apparatus.

FIG. 1 is a block diagram illustrating a hardware configuration of an image forming apparatus 100.

The image forming apparatus 100 has a copy function, a print function, and an image scan function. The image forming apparatus 100 allows the copy or print function and the scan function to be operated in parallel.

A main controller 10 includes a processor (not illustrated) and a storage for storing a program and data. The program causes the processor to perform all process for the image forming apparatus as described later.

The main controller 10 is coupled to an operation panel 12, a scanner 13, a print engine 14, a communication unit 15, a memory 16, and an image processing device 20 via a bus 11. The communication unit 15 is coupled to an external host computer. The image processing device 20 is also coupled to the scanner 13 and the print engine 14. In FIG. 1, an arbitration circuit for the bus 11 is omitted.

The operation panel 12 and the communication unit 15 function as input devices.

When receiving a print request from the host computer via the communication unit 15, the main controller 10 stores page description language (PDL) data thereon into the memory 16 via the communication unit 15, requests the image processing device 20 for printing, starts up a sheet transport apparatus (not illustrated), and notifies the print engine 14 when the printing is ready.

In response to the print request, the image processing device 20 reads the PDL data from within the memory 16, processes the PDL data, and converts the PDL data into intermediate language data. The image processing device 20 expands the intermediate language data to bitmap data, and performs process for rotation, enlargement/reduction, and the like for an image based on a default value and a value set on the operation panel 12. The image processing device 20 supplies the processed bitmap data to the print engine 14, and causes the print engine 14 to perform printing process.

A user operates the operation panel 12 to request the main controller 10 for image scanning. In response to the request, the main controller 10 sets the scanner 13 based on the default value and the value set on the operation panel 12, operates an automatic sheet feeder (not illustrated) on which an original is placed, and causes the scanner 13 to scan an image of the original and convert the image of the original into image data. The image data is supplied to the image processing device 20, and is converted into a halftone. Then, the image thereof is compressed, and is stored into the memory 16.

Additionally, a user operates the operation panel 12 to request the main controller 10 for copying. In response to the request, similar to image scanning, the main controller 10 stores the image data into the memory 16, and requests the image processing device 20 for printing. In response to the request for printing, the image processing device 20 reads the image data from within the memory 16, and performs the process for rotation, enlargement/reduction, and the like for the image based on the default value and the value set on the operation panel 12. The image processing device 20 supplies the processed image data to the print engine 14, and causes the print engine 14 to perform the printing process.

As indicated by the dotted line in FIG. 1, the image processing device 20 is physically divided into a print image processing unit 21 and a scanned image processing unit 22. The print image processing unit 21 and the scanned image processing unit 22 are electrically coupled to each other via a cable in a removable manner. Therefore, the print image processing unit 21 and the scanned image processing unit 22 can be developed or modified independently of each other. In FIG. 1, the print image processing unit 21 and the scanned image processing unit 22 are illustrated as an integral unit.

In the print image processing unit 21, an MPU 23 is coupled to a direct memory access controller (DMAC) 25 and a processor interface module 26 via a bus 24. The MPU 23 is further coupled to the main controller 10 via the bus 11.

When receiving the request for printing from the main controller 10, the MPU 23 burst-transfers a part of the PDL data within the memory 16 to a buffer memory built into the MPU 23 via the DMAC 25, and expands the PDL data to a bitmap. In this case, a part of the image process is performed by the print image processing unit 21, as described later, and the bitmap data is burst-transferred to a corresponding area within the processor interface module 26 via the DMAC 25.

When a data amount of the area becomes equal to or smaller than a predetermined value, the processor interface module 26 sends an interrupt to the MPU 23. In response to the interrupt, the MPU 23 subjects a part of the subsequent bitmap data to the burst transfer process, expansion process, and transfer process. This three step process is repeatedly performed.

The processor interface module 26 is a dual port memory. One of its ports is coupled to the bus 24, and the other port is coupled to a hub 27.

The hub 27 of the print image processing unit 21 is coupled to an image rotation module 32, a first image processing module 29 for image decompression, a second image processing module 30 for rasterization, and a third image processing module 31 for image compression, each of which is a hardware module including a buffer memory for processing data within the processor interface module 26. The hub 27 is coupled to a print engine interface module 39 for converting the processed image data into a video signal and supplying the video signal to the print engine 14. In addition, the hub 27 is coupled to a DMAC 33 for transferring data between the buffer memory within the module and the buffer memory within another module.

In the same manner, a hub 28 of the scanned image processing unit 22 is coupled to a scanner interface module 34 for providing a scanned image, which is a hardware module including a buffer memory. The hub 28 is coupled to a JPEG compression module 35, a JPEG decompression module 36, a halftone processing module 37, and a fourth image processing module 38 for image enlargement/reduction and the like, each of which is used for processing a scanned image.

Modules 29 to 32 and 39 of the print image processing unit 21 that are coupled to the hub 27 and the modules 34 to 38 of the scanned image processing unit 22 that are coupled to the hub 28 share processing that can be processed by the MPU 23 if the MPU 23 is high-performance. In other words, the modules 29 to 32 and 39 and the modules 34 to 38 function as co-processors for the MPU 23. The processor interface module 26 functions as an interface (transfer buffer) between those co-processors and the MPU 23. In other words, by using ASIC modules to perform distributed processing, it is possible to improve cost performance of the entire image processing device 20.

Figure 2A:
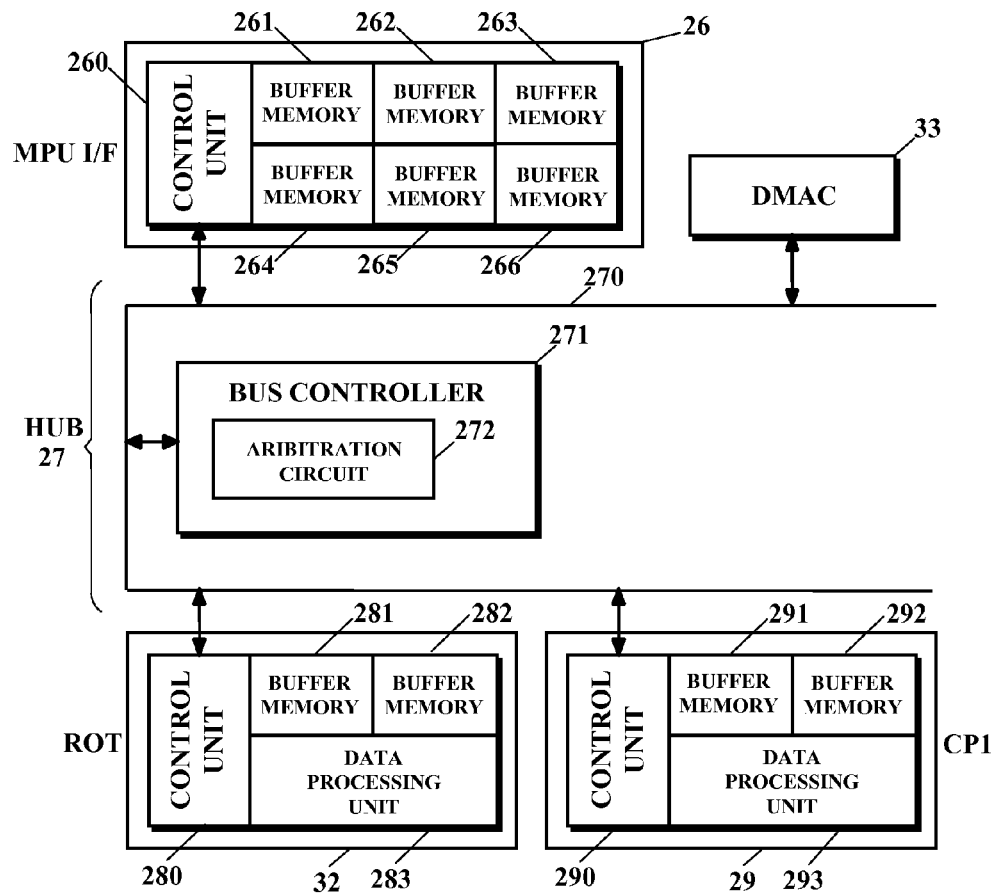
FIG. 2A is a block diagram illustrating configurations of a hub within the image forming apparatus and modules coupled to the hub.

FIG. 2A is a block diagram illustrating configurations of the hub 27 within the image forming apparatus 100 and the modules coupled to the hub 27.

The hub 27 includes a bus 270 coupled to the respective modules and a bus controller 271 that controls a part of data transfers between the modules via the bus 270. The remaining data transfers are controlled by the DMAC 33. The bus 270 includes an address bus, a data bus, and a control bus (C bus). The bus controller 271 includes an arbitration circuit 272 for arbitrating bus use right requests received from the respective modules.

The processor interface module 26 includes a control unit 260 and buffer memories 261 to 266 corresponding to three transfer destinations and three transfer sources.

The MPU 23 illustrated in FIG. 1 writes bitmap data to the buffer memory 261 via the DMAC 25. When this series of writing is completed, the control unit 260 requests the arbitration circuit 272 for a right of using the address bus and the data bus (bus use right request) via an independent signal line.

Figure 2B:
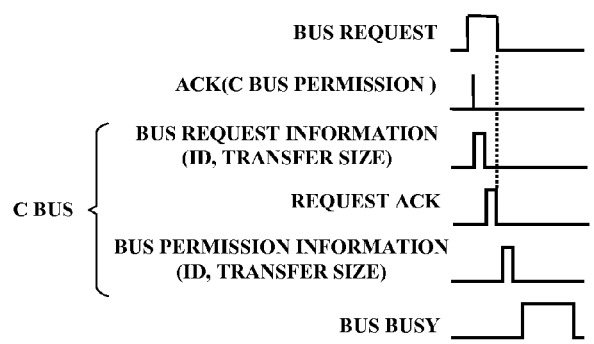
FIG. 2B is a schematic diagram illustrating signals indicating a bus request, control bus permission, and bus busy, and signals on a C bus.

FIG. 2B is a schematic diagram illustrating signals indicating a bus use right request, C bus permission, and bus busy signal, and signals on the C bus (combination of an information type and an information content).

The arbitration circuit 272 activates a C bus use permission signal (ACK signal in response to the bus request) for the control unit 260 via the bus controller 271. In response to the activation, the control unit 260 uses the C bus to transmit an inter-module transfer ID and a transfer size as bus request information that is sent to the arbitration circuit 272 via the bus controller 271.

A starting address of a transfer source buffer memory and a starting address of a transfer destination buffer memory are defined by the inter-module transfer ID. The transfer source buffer memory exists within a transfer source module, and the transfer destination buffer memory exists within a transfer destination module. Therefore, the transfer source or transfer destination module is defined by a starting address of the buffer memory. FIG. 3A is a tabular diagram illustrating a relationship between a transfer source module name and a transfer destination module name for each inter-module transfer ID of the modules relating to print image process. Shown in FIG. 3B, a tabular diagram illustrates a relationship between a transfer source module name and a transfer destination module name for each inter-module transfer ID of the modules relating to scanned image processes. FIG. 3C is a tabular diagram illustrating a relationship between a transfer source buffer address and a transfer destination buffer address for each inter-module transfer ID.

The DMAC 33 includes the table illustrated in FIG. 3C. Further, a control unit of each module includes a register in which the inter-module transfer ID defined by the buffer memory of the module is stored.

In FIG. 2B, when receiving the bus request information, the arbitration circuit 272 adds the bus request information to a queue, and transmits a request ACK (information type) including the inter-module transfer ID (information content) onto the C bus via the bus controller 271. In response to the transmission, a bus request source deactivates the above-described bus request. After permitting the bus request for the inter-module transfer ID, the arbitration circuit 272 transmits a DMA transfer request (information type) including the inter-module transfer ID (permission ID) and the transfer size (information content) onto the C bus via the bus controller 271.

The DMAC 33 refers to the table illustrated in FIG. 3C to acquire a starting address of a transfer source buffer and a starting address of a transfer destination buffer corresponding to the inter-module transfer ID, and sets the respective starting addresses in an internal counter for a transfer source address and an internal counter for a transfer destination address. Further, the DMAC 33 sets the transfer size in the internal counters. Additionally, in parallel with the above-described process, the control unit of the module including the buffer memory corresponding to the permission ID brings the buffer memory into a read state or a write state in accordance with the inter-module transfer ID. The control unit of the module that does not include the buffer memory corresponding to the permission ID brings the own module into a disabled state.

The DMAC 33 further activates a bus busy signal, and burst-transfers data having the above-described transfer size from the transfer source buffer memory to the transfer destination buffer memory while controlling the above-described counters. When the burst transfer is completed, the DMAC 33 deactivates the bus busy signal. In response to changing the bus busy signal to the inactive state, the arbitration circuit 272 determines the next permission ID.

The image rotation module 32 illustrated in FIG. 2A includes a control unit 280, buffer memories 281 and 282, and a data processing unit 283. The control unit 280 starts up the data processing unit 283 when being notified that the data transfer to the buffer memory 281 has been completed based on the change of the bus busy signal to the inactive state. The data processing unit 283 processes the data within the buffer memory 281, and writes results thereof to the buffer memory 282. When the above-described process is completed, the control unit 280 requests the arbitration circuit 272 for a bus use right in terms of the data transfer from the buffer memory 281 to a buffer memory 291, and the same process as the above-described process is performed.

Referring back to FIG. 1, the data processed by the image processing module 29 is transferred to the image processing module 30 via the hub 27, and the data processed by the image processing module 30 is transferred to the image processing module 31 via the hub 27.

An average data transfer rate from the print engine interface module 39 to the print engine 14 may be relatively low because of mechanical processes performed by the print engine 14. Therefore, the data processed by the image processing module 31 is transferred to the buffer memory 262 of the processor interface module 26 illustrated in FIG. 2A via the hub 27. When the data transfer to the buffer memory 262 is completed, the control unit 260 sends an interrupt to the MPU 23. In response to the interrupt, the MPU 23 saves the data within the buffer memory 262 to the memory 16 via the DMAC 25. In an initial session of each print job, the control unit 260 copies the data within the buffer memory 262 to the buffer memory 263 before saving the data.

In response to the notification that the printing is ready, the print engine 14 prepares for the printing, and then requests the data from the print engine interface module 39. When detecting that the data within the buffer memory has an amount equal to or smaller than a predetermined value, the print engine interface module 39 requests the arbitration circuit 272 for a bus use right.

When the arbitration circuit 272 permits the request for the bus use right, the bitmap data is transferred from the buffer memory 263 to within the buffer memory of the print engine interface module 39. The buffer memory within the print engine interface module 39 is a dual port memory, and the control unit of the print engine interface module 39 can read the data from the buffer memory in parallel with the transfer of the bitmap data. The control unit of the print engine interface module 39 reads the bitmap data from the buffer memory, decompresses the bitmap data to be converted into a video signal, and supplies the video signal to the print engine 14.

The above-described operation of the print engine interface module 39 is an operation serving as an interface (transfer buffer) between the print engine 14 and the processor interface module 26.

When the buffer memory 263 including the data becomes empty, the control unit 260 sends an interrupt to the MPU 23. In response to the interrupt, the MPU 23 transfers the next piece of bitmap data saved within the memory 16 to the buffer memory 263 via the DMAC 25.

On the other hand, in the image scanning, the scanner interface module 34 receives the image data from the scanner 13, and when the data amount of the buffer memory of the scanner interface module 34 becomes equal to or larger than a predetermined value, the control unit of the scanner interface module 34 requests the arbitration circuit 272 for a bus use right. The buffer memory is a dual port memory, and the control unit of the scanner interface module 34 can read the image data from the buffer memory in parallel with the reception of the image data.

When the arbitration circuit 272 permits the request for the bus use right, the scanned image data is transferred from the buffer memory of the scanner interface module 34 to one of buffer memories within the halftone processing module 37 via the DMAC 33.

The above-described operation of the scanner interface module 34 is an operation serving as an interface (transfer buffer) between the scanner 13 and the halftone processing module 37.

Subsequently, an image processing unit within the halftone processing module 37 performs halftone process for the image data within the buffer memory. Results of the halftone process are written to the other one of the buffer memories within the halftone processing module 37. When the above-described process is completed, the control unit within the halftone processing module 37 transfers the data from the other one of the buffer memories to one of the buffer memories of the JPEG compression module 35 via the DMAC 33. When data compression process is finished by the JPEG compression module 35, compressed image data is transferred from the JPEG compression module 35 to the buffer memory 264 of the processor interface module 26 via the DMAC 33, and then from the buffer memory 264 to the memory 16 via the DMAC 25.

The user may use the operation panel 12 to request, for example, reduction process for the scanned image. The main controller 10 sends a notification of the request to the MPU 23. In response to the notification, the MPU 23 transfers the compressed scanned image data saved within the memory 16 to the buffer memory 265 of the processor interface module 26 via the DMAC 25. Subsequently, the control unit 260 of the processor interface module 26 transfers the compressed image data from the buffer memory 265 to the JPEG decompression module 36 via the DMAC 33. When the compressed image data is decompressed by the JPEG decompression module 36, the decompressed image data is transferred from the JPEG decompression module 36 to the image processing module 38 via the DMAC 33. When the reduction process is finished by the image processing module 38, the image data is transferred from the image processing module 38 to the buffer memory 266 of the processor interface module 26 via the DMAC 33. Subsequently, in response to the request received from the control unit 260, the MPU 23 transfers the scanned image data that has been subjected to the reduction process from the buffer memory 266 to the memory 16 via the DMAC 25.

In FIG. 1, in the case of performing the scanned image process while printing the image, when the buffer within the print engine interface module 39 becomes empty during the image printing due to a delay of the data transfer from the processor interface module 26 to the print engine interface module 39, an abnormal image may be generated.

In particular, the number of image processing requests performed by the print image processing unit 21 in a first multi-operation in which the print function and the scan function are operated in parallel is larger than the number of image processing requests performed by the print image processing unit 21 in a second multi-operation in which a copy function and the scan function are operated in parallel. As a result, the likelihood of generating an abnormal image is high. Therefore, in the first multi-operation, image processing performance of the print image processing unit 21 is improved, which may thereby suppress the likelihood that an abnormal image will be generated.

On the other hand, the number of image processing requests performed by the print image processing unit 21 in the second multi-operation is smaller than the number of image processing requests performed by the print image processing unit 21 in the first multi-operation. Therefore, in the second multi-operation, image processing performance of the scanned image processing unit 22 is improved, which may thereby improve performance of the image forming apparatus 100. Note that, the scan function includes a scan-to-box function for scanning an image and storing an image file thereof into an auxiliary storage device.

In order to lower the frequency of the generation of the abnormal image, when, for example, in FIG. 1, the modules of the print image processing unit 21 coupled to the hub 27 and the modules of the scanned image processing unit 22 coupled to the hub 28 have their bandwidths controlled on a module-to-module basis, the control system becomes complex. Additionally, the data transfer from the processor interface module 26 to the print engine interface module 39 and the data transfer from the scanner interface module 34 to the processor interface module 26 are intermittently performed for relatively long periods. The delay of the data transfer causes such an error that the abnormal image is printed or the scanned image data is missing.

Therefore, the following permission time slot control is performed on a group-to-group basis so that the processor interface module 26 is shared and the bus use right is granted alternately to a first module group (modules 26, 29 to 32, and 39) as a unit of print image processing modules coupled to the hub 27 and a second module group (modules 26 and 34 to 38) as a unit of scanned image processing modules coupled to the hub 28.

Figure 4A:
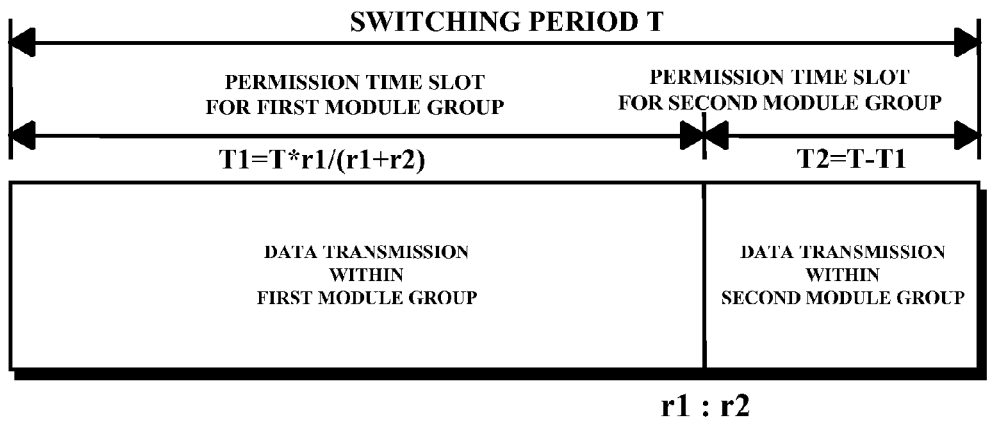
FIG. 4A is an explanatory diagram of a switching period T and a ratio r1:r2 between permission time slots T1 and T2 for the first module group and the second module group, respectively, during a parallel operation of a print function and a scan function (first multi-operation)
Figure 4B:
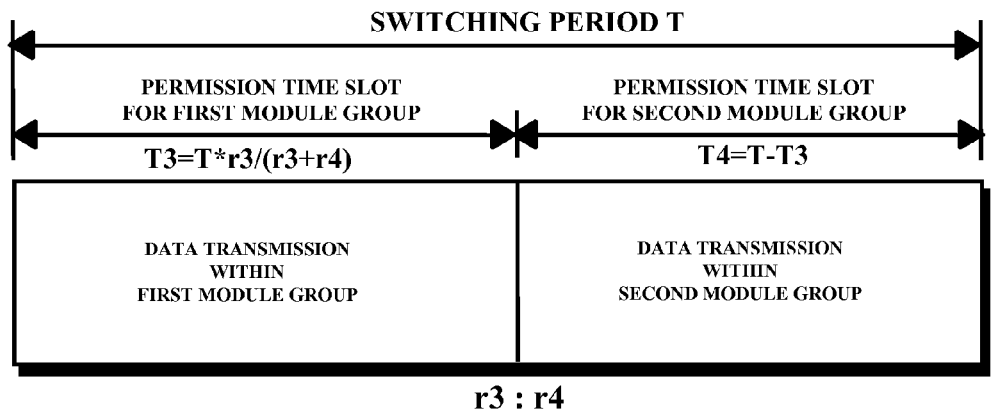
FIG. 4B is an explanatory diagram of the switching period T and a ratio r3:r4 between permission time slots T3 and T4 for the first module group and the second module group, respectively, during a parallel operation of a copy function and the scan function (second multi-operation)

FIG. 4A is an explanatory diagram of a switching period T and a ratio r1:r2 between permission time slots T1 and T2 for the first module group and the second module group, respectively, during the parallel operation of the print function and the scan function (first multi-operation). FIG. 4B is an explanatory diagram of the switching period T and a ratio r3:r4 between permission time slots T3 and T4 for the first module group and the second module group, respectively, during the parallel operation of the copy function and the scan function (second multi-operation). In other words, as illustrated in FIGS. 4A and 4B, for the data transfer using the bus 270, the ratio r1:r2 between the permission time slots T1 and T2 associated with the first module group and the second module group, respectively, in the case of the first multi-operation and the ratio r3:r4 between the permission time slots T3 and T4 associated with the first module group and the second module group, respectively, in the case of the second multi-operation are defined so as to satisfy $r1/(r1+r2)>r3/(r3+r4)$ or $r2/(r1+r2)<r4/(r3+r4)$. This prevents the above-described error from occurring in the first multi-operation, and speeds up the scanned image process in the second multi-operation, to thereby improve the performance of the image forming apparatus 100.

As the switching periods (T=T1+T2, T=T3+T4) for the bus use right between the first module group and the second module group become longer, switching overhead is reduced to a lower level. However, if the switching periods are too short, the above-described error occurs. Therefore, the switching periods are defined comprehensively.

For the first module group, in order to prevent the occurrence of the above-described error, the highest priority is assigned to the data transfer from the processor interface module 26 to the print engine interface module 39. In addition, the data transfer from the image rotation module 32 to the image processing module 29 is assigned with a higher priority than the data transfers from the image processing module 29 to the image processing module 30, from the image processing module 30 to the image processing module 31, and from the image processing module 31 to the processor interface module 26.

For the second module group, the highest priority is assigned to the data transfer from the scanner interface module 34 to the halftone processing module 37. The data transfers, which follow the above-described data transfer, from the halftone processing module 37 to the JPEG compression module 35 and from the JPEG compression module 35 to the processor interface module 26 are assigned with a higher priority than the data transfers from the processor interface module 26 to the JPEG decompression module 36, from the JPEG decompression module 36 to the image processing module 38, and from the image processing module 38 to the processor interface module 26.

In addition, when the request for the bus use right is received from a module having a higher priority while a given module is using the bus 270, switching the bus use right at that time point causes overhead. However, a capacity of the buffer of each module is relatively small.

Therefore, the arbitration circuit 272 waits until the current inter-module data transfer is completed, and determines the next module for which the bus use right is to be permitted. To that end, priority-specific queues are provided inside the arbitration circuit 272. The arbitration circuit 272 determines the module for which the bus use right is to be permitted in accordance with the priority at a time point when the bus is released or, in other words, the bus busy signal changes to the inactive state.

Figure 5:
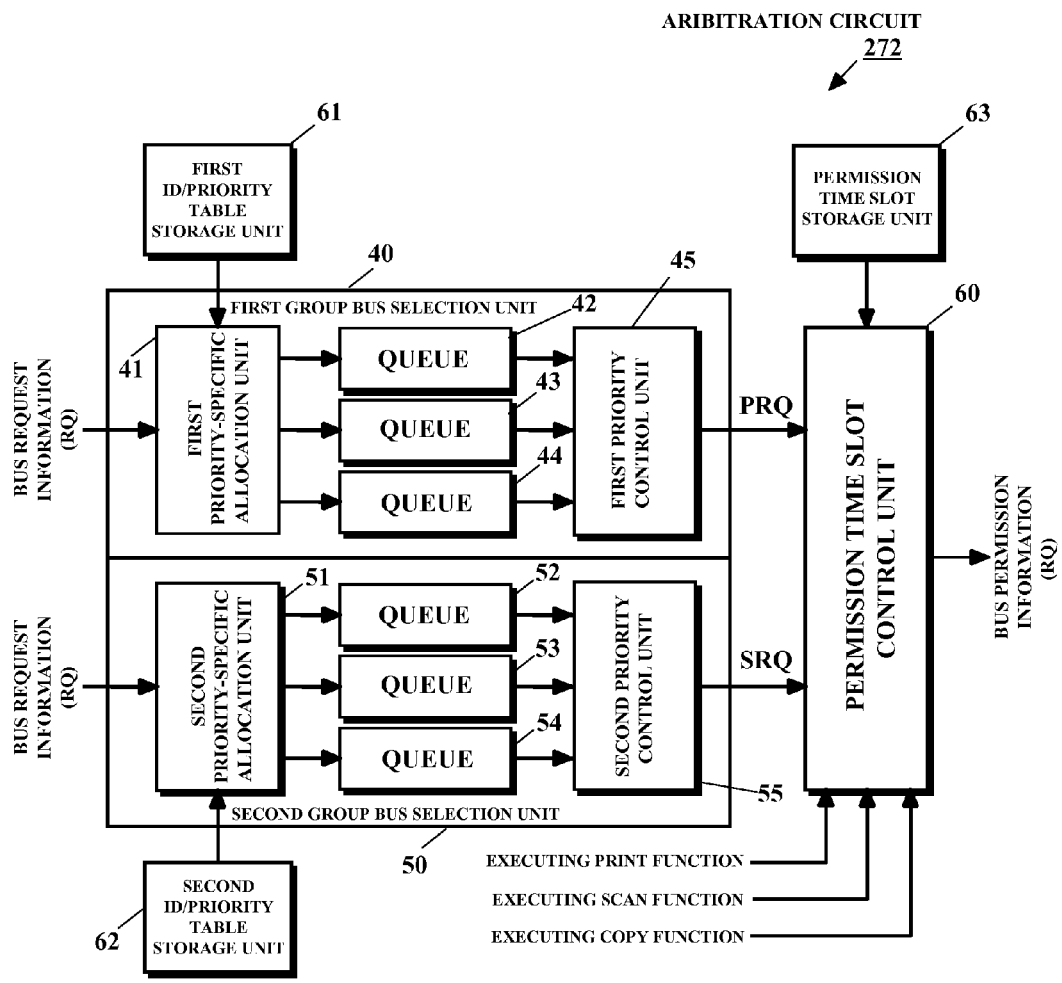
FIG. 5 is a block diagram illustrating a configuration of an arbitration circuit of the image forming apparatus.

FIG. 5 is a block diagram illustrating a configuration of the arbitration circuit 272 of the image forming apparatus 100. The arbitration circuit 272 includes components 40, 50, and 60 to 63.

The first group bus request selection unit 40 selects, when requests for the bus use right are received from a plurality of modules within the first module group at the time point when the bus is released, the bus request information (ID and transfer size) on one of the modules as first group bus request information (PRQ). The first group bus request selection unit 40 includes components 41 to 45. The second group bus request selection unit 50 selects, when requests for the bus use right are received from a plurality of modules within the second module group at the time point when the bus is released, the bus request information on one of the modules as second group bus request information (SRQ). The second group bus request selection unit 50 includes components 51 to 55.

The permission time slot control unit 60 outputs one of the first group bus request information PRQ and the second group bus request information SRQ as bus permission information RQ by switching therebetween every permission time period.

Referring to FIGS. 3D and 3E, FIG. 3D is a table diagram illustrating a priority of the inter-module transfer ID within the first module group coupled to the hub 27. FIG. 3E is a table diagram showing a priority of the inter-module transfer ID within the second module group coupled to the hub 28. The settings illustrated in FIG. 3D are stored in the first ID/priority table storage unit 61. The first group bus request selection unit 40 uses the above-described settings to perform the following bus request selection control. In other words, the first priority-specific allocation unit 41 refers to the first ID/priority table storage unit 61 to add the bus request information to: the queue 42 when the ID included in the bus request information RQ on the C bus is associated with a priority "1"; to the queue 43 when the ID is associated with a priority "2"; and to the queue 44 when the ID is associated with a priority "3".

The first priority control unit 45 extracts, if the bus request information is included in the queue 42 at the time point when the bus is released, a top element thereof, and supplies the top element to the permission time slot control unit 60 as the first group bus request information PRQ. If the bus request information is not included in the queue 42 but is included in the queue 43, the first priority control unit 45 extracts a top element thereof, and supplies the top element to the permission time slot control unit 60 as the first group bus request information PRQ. If the bus request information is not included in the queue 42 or 43 but is included in the queue 44, the first priority control unit 45 supplies a top element thereof to the permission time slot control unit 60 as the first group bus request information PRQ.

The settings illustrated in FIG. 3E are stored in the second ID/priority table storage unit 62. The second group bus request selection unit 50 uses the above-described settings to perform the following bus request selection control. In other words, the second priority-specific allocation unit 51 refers to the second ID/priority table storage unit 62 to add the bus request information to: the queue 52 when the ID included in the bus request information RQ on the C bus is associated with a priority "1"; to the queue 53 when the ID is associated with a priority "2"; and to the queue 54 when the ID is associated with a priority "3".

The second priority control unit 55 extracts, if the bus request information is included in the queue 52 at the time point when the bus is released, a top element thereof, and supplies the top element to the permission time slot control unit 60 as the second group bus request information SRQ. If the bus request information is not included in the queue 52 but is included in the queue 53, the second priority control unit 55 extracts a top element thereof, and supplies the top element to the permission time slot control unit 60 as the second group bus request information SRQ. If the bus request information is not included in the queue 52 or 53 but is included in the queue 54, the second priority control unit 55 supplies a top element thereof to the permission time slot control unit 60 as the second group bus request information SRQ.

Figure 6:
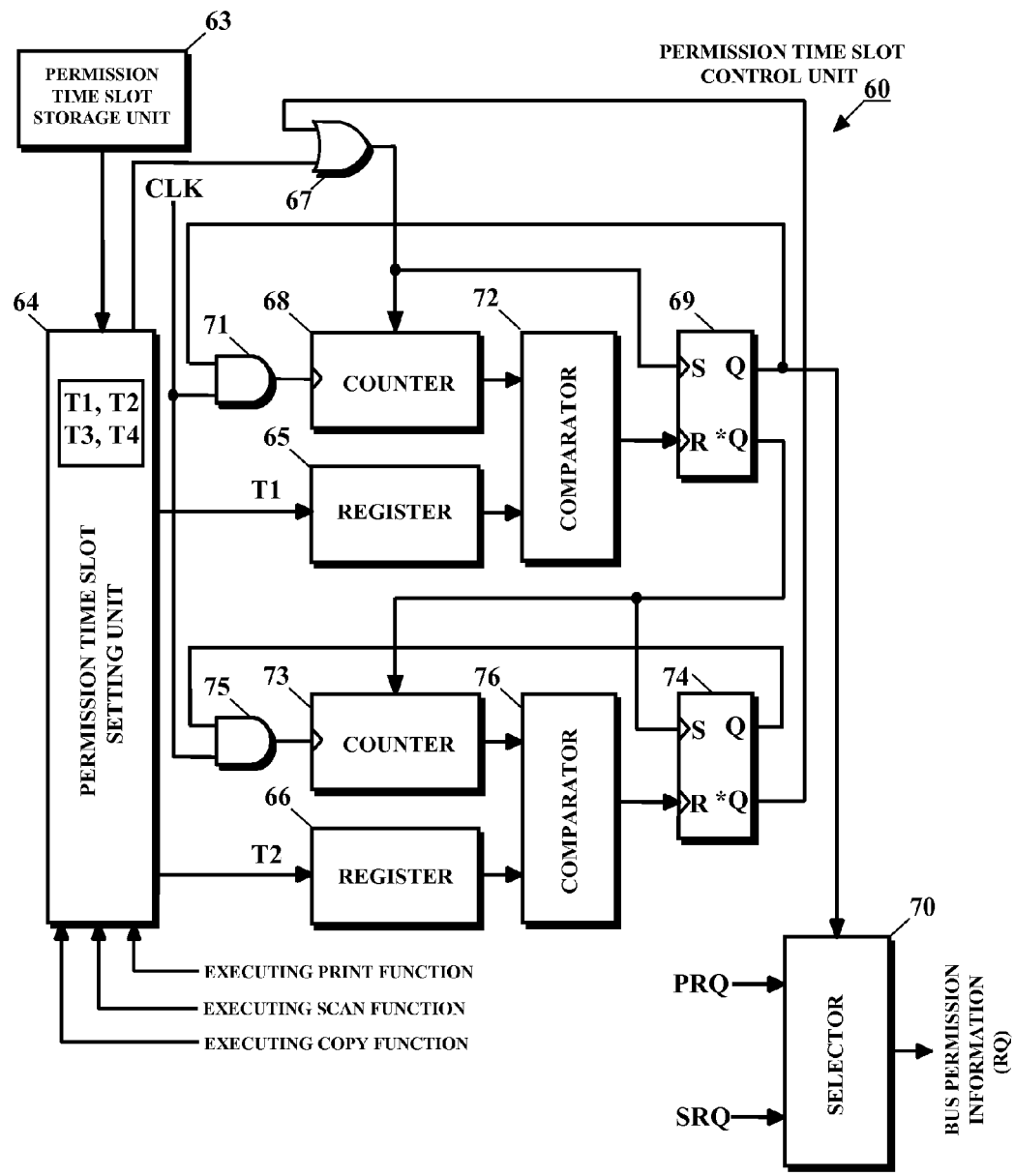
FIG. 6 is a block diagram illustrating a configuration of a permission time slot control unit of the arbitration circuit.

FIG. 6 is a block diagram illustrating a configuration of the permission time slot control unit 60 of the arbitration circuit 272. The permission time slot control unit 60 includes components 63 to 76.

The permission time slot storage unit 63 stores the ratios r1:r2 and r3:r4 and the above-described switching period T using a clock CLK as a unit.

The permission time slot setting unit 64 uses data within the permission time slot storage unit 63 at a time of reset (including power-on) to calculate $T1=T*r1/(r1+r2)$ and $T2=T-C1$, which represent the permission time slot for the first group bus request information PRQ and the permission time slot for the second group bus request information SRQ, respectively, used during the first multi-operation, and to calculate $T3=T*r3/(r3+r4)$ and $T4=T-C3$, which represent the permission time slot for the first group bus request information PRQ and the permission time slot for the second group bus request information SRQ, respectively, used during the second multi-operation. Then, the permission time slot setting unit 64 stores those results into the memory or the register.

The permission time slot setting unit 64 is supplied with signals indicating that the print function is in operation (that the image data is being processed in the first module group), that the scan function is in operation (that the image data is being processed in the second module group), and that the copy function is in operation (that the image data is being processed in the first module group). The permission time slot setting unit 64 sets T1 and T2 in the registers 65 and 66, respectively, during the first multi-operation, and sets T3 and T4 in the register 65 and 66, respectively, during the second multi-operation.

In response to the start of a parallel operation of both the print and scan functions or both, the copy and scan functions, the permission time slot setting unit 64 supplies one pulse to a clear input terminal of the counter 68 and a set input terminal of the RS flip-flop 69 via the OR gate 67. Accordingly, an output of the counter 68 is zero-cleared, and a Q output and a *Q output of the RS flip-flop 69 shift to "1" and "0", respectively.

The selector 70 selects the first group bus request information PRQ from among the inputs of the first group bus request information PRQ and the second group bus request information SRQ when the Q output of the RS flip-flop 69 is "1". The selector 70 selects the second group bus request information SRQ when the Q output is "0", and the selected one as the bus permission information RQ.

The Q output of the RS flip-flop 69 is supplied to one of input terminals of the AND gate 71, and the clock CLK is supplied to the other one of the input terminals of the AND gate 71. Accordingly, a pulse of the clock CLK is counted by the counter 68, and a value thereof and a value of the register 65 are compared with each other by the comparator 72. When both the values match each other, the comparator 72 supplies the matched pulse to a reset input terminal of the RS flip-flop 69. Accordingly, the Q output and the *Q output of the RS flip-flop 69 shift to "0" and "1", respectively, and the AND gate 71 is closed.

On the other hand, the *Q output of the RS flip-flop 69 is supplied to a clear input terminal of the counter 73 and a set input terminal of the RS flip-flop 74. Accordingly, a count of the counter 73 is zero-cleared, the RS flip-flop 74 shifts to a set state, the AND gate 75 is opened, and the pulse of the clock CLK is counted by the counter 73. A count value of the counter 73 and a value of the register 66 are compared with each other by the comparator 76. When both the values match each other, the comparator 76 supplies the matched pulse to a reset input terminal of the RS flip-flop 74. Accordingly, the Q output and the *Q output of the RS flip-flop 74 shift to "0" and "1", respectively, and the AND gate 75 is closed.

The *Q output of the RS flip-flop 74 is supplied to the OR gate 67. Accordingly, the RS flip-flop 69 is brought to a set state.

In this manner, during the first multi-operation, the selector 70 outputs one of the first group bus request information PRQ and the second group bus request information SRQ as the bus permission information RQ by alternately making a selection therebetween with the ratio r1:r2 and the switching period T. Alternatively, during the second multi-operation, the selector 70 outputs one of the first group bus request information PRQ and the second group bus request information SRQ as the bus permission information RQ by alternately making a selection therebetween with the ratio r3:r4 and the switching period T.

Figure 7:
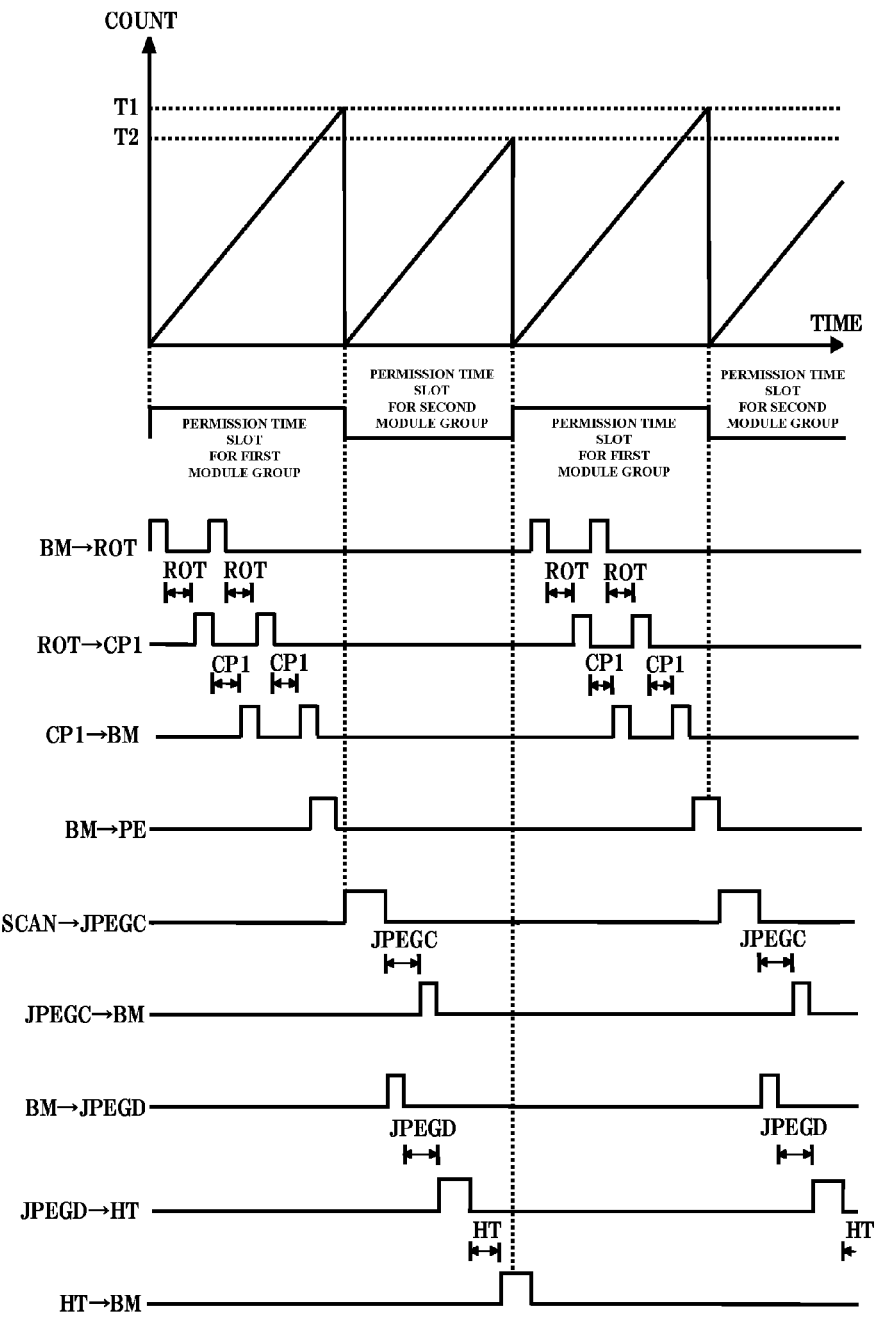
FIG. 7 is a timing chart illustrating an operation of an image processing device of the image forming apparatus.

FIG. 7 is a timing chart illustrating an operation of the image processing device 20 of the image forming apparatus 100. In FIG. 7, process performed by the image processing modules 30, 31, and 38 is omitted. The first priority control unit 45 and the second priority control unit 55 extract the top element of the queue at the time point when the bus is released, and supply the top element to the selector 70. Therefore, when the data transfer is being performed at a time point of the switching, after the data transfer is finished, the next piece of bus request information RQ is selected.

While various aspects and embodiments have been disclosed herein, other aspects and embodiments are possible. Other designs may be used in which the above-described components are each present.

For example, the permission time slots T1 to T4 may be directly set instead of setting the ratios r1:r2 and r3:r4 and the switching period T. Further, the switching period used during the first multi-operation and the switching period used during the second multi-operation may be set to different values.

For example, different combinations from the above-described combinations may be used as the image processing modules within the first module group and the image processing modules within the second module group depending on throughput of the MPU 23 and the image process to be provided.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a print engine;
   a scanner;
   a processor;
   a bus;
   a plurality of modules coupled to the bus, wherein respective modules of the plurality of modules each comprise a buffer memory; and an arbitration circuit that permits respective modules of the plurality of modules to use the bus in response to a bus request received from the plurality of modules, wherein:

the plurality of modules comprise:
- a plurality of ASIC modules for printing that function as co-processors for the processor;
- a plurality of ASIC modules for the scanner that function as co-processors for the processor; and
- a processor interface module that is coupled to the processor and functions as a transfer buffer between the processor and the bus, and the arbitration circuit is configured to:
- determine inter-buffer memory data transfer from one of two modules among the plurality of modules to another of the two modules as permitted data transfer based on a priority set therefor;
- allocate a permission time slot, in which the bus request for the inter-buffer memory data transfer is permitted, to each of a first module group including the processor interface module and the plurality of ASIC modules for printing and a second module group including the processor interface module and the plurality of ASIC modules for the scanner, in each of a first multi-operation in which a print function and an image scan function are operated in parallel and a second multi-operation in which a copy function and the image scan function are operated in parallel;
- alternately set the permission time slot allocated to the first module group and the permission time slot allocated to the second module group in one of the first multi-operation and the second multi-operation; and
- permit the bus request for the inter-buffer memory data transfer within the first module group in the permission time slot allocated to the first module group, and permit the bus request for the inter-buffer memory data transfer within the second module group in the permission time slot allocated to the second module group, the permission time slot being defined so that a value obtained by dividing the permission time slot allocated to the first module group by the permission time slot allocated to the second module group is larger in the first multi-operation than in the second multi-operation.

2. The image forming apparatus according to claim 1, wherein the plurality of ASIC modules for printing comprises a print engine interface module that functions as a transfer buffer between the processor interface module and the print engine.

3. The image forming apparatus according to claim 1, wherein the plurality of ASIC modules for the scanner comprises a scanner interface module that functions as a transfer buffer between the scanner and one image processing module among the plurality of ASIC modules for the scanner.

4. The image forming apparatus according to claim 1, further comprising a main controller and an input device,
wherein the main controller operates one of a print function, a copy function, and an image scan function in response to an input through the input device, and one of the plurality of ASIC modules for printing and the plurality of ASIC modules for the scanner operate in accordance with the operated one of the print function, the copy function, and the image scan function.

5. The image forming apparatus according to claim 1, wherein:

the arbitration circuit comprises bus request queues, wherein respective bus request queues of the bus request queues are associated with a priority-basis; and the arbitration circuit extracts bus request information from one of the bus request queues based on a priority threshold, in response to a change to an inactive state for a bus busy signal indicating that the inter-buffer memory data transfer is being performed, to thereby permit the bus request.

6. The image forming apparatus according to claim 5, wherein the bus request information comprises a transfer size and an inter-buffer memory transfer ID that specifies the two modules for which the inter-buffer memory data transfer is to be performed.

7. The image forming apparatus according to claim 6, wherein:

the bus is further coupled to a direct memory access controller (DMAC) module; and the DMAC module operates the inter-buffer memory data transfer in a burst transfer mode based on the bus request information permitted by the arbitration circuit.

8. The image forming apparatus according to claim 6, wherein the arbitration circuit further comprises:

a table associating the inter-buffer memory transfer ID with the priority;

a first priority-specific allocation unit within the first module group that refers to the table to allocate the bus request information to the bus request queues on the priority basis; and a second priority-specific allocation unit within the second module group that refers to the table to allocate the bus request information to the bus request queues on the priority basis.

9. An image forming apparatus, comprising:
- a print engine;
- a scanner;
- a processor;
- a bus;
- a plurality of modules coupled to the bus, wherein respective modules of the plurality of modules comprise a buffer memory; and
- an arbitration circuit that permits respective modules of the plurality of modules to use the bus in response to a bus request received from the plurality of modules;
- an input device; and
- a main controller, wherein:

the plurality of modules comprise:
- a plurality of ASIC modules for printing that function as co-processors for the processor;
- a plurality of ASIC modules for the scanner that function as co-processors for the processor; and
- a processor interface module that is coupled to the processor and functions as a transfer buffer between the processor and the bus, the plurality of ASIC modules for printing comprising a print engine interface module that functions as a transfer buffer between the processor interface module and the print engine, the plurality of ASIC modules for the scanner comprising a scanner interface module that functions as a transfer buffer between the scanner and one image processing module among the plurality of ASIC modules for the scanner;

the main controller operates one of a print function, a copy function, and an image scan function in response to an input through the input device, and one of the plurality of ASIC modules for printing and the plurality of ASIC modules for the scanner operate in accordance with the operated one of the print function, the copy function, and the image scan function; and the arbitration circuit is configured to:
determine inter-buffer memory data transfer from one of two modules among the plurality of modules to another of the two modules as permitted data transfer based on a priority set therefor;

allocate a permission time slot, in which the bus request for the inter-buffer memory data transfer is permitted, to each of a first module group including the processor interface module and the plurality of ASIC modules for printing and a second module group including the processor interface module and the plurality of ASIC modules for the scanner, in each of a first multi-operation in which a print function and an image scan function are operated in parallel and a second multi-operation in which a copy function and the image scan function are operated in parallel;

alternately set the permission time slot allocated to the first module group and the permission time slot allocated to the second module group in one of the first multi-operation and the second multi-operation; and permit the bus request for the inter-buffer memory data transfer within the first module group in the permission time slot allocated to the first module group, and permit the bus request for the inter-buffer memory data transfer within the second module group in the permission time slot allocated to the second module group, the permission time slot being defined so that a value obtained by dividing the permission time slot allocated to the first module group by the permission time slot allocated to the second module group becomes larger in the first multi-operation than in the second multi-operation.

10. The image forming apparatus according to claim 9, wherein:
the arbitration circuit comprises bus request queues, wherein respective bus request queues of the bus request queues are associated with a priority-basis; and
the arbitration circuit extracts bus request information from one of the bus request queues based on a priority threshold, in response to a change to an inactive state for a bus busy signal indicating that the inter-buffer memory data transfer is being performed, to thereby permit the bus request.

11. The image forming apparatus according to claim 10, wherein the bus request information comprises a transfer size and an inter-buffer memory transfer ID that specifies the two modules for which the inter-buffer memory data transfer is to be performed.

12. The image forming apparatus according to claim 10, wherein:
the bus is further coupled to a direct memory access controller (DMAC) module; and
the DMAC module operates the inter-buffer memory data transfer in a burst transfer mode based on the bus request information permitted by the arbitration circuit.

13. The image forming apparatus according to claim 10, wherein the arbitration circuit further comprises:
a table associating the inter-buffer memory transfer ID with the priority;
a first priority-specific allocation unit within the first module group that refers to the table to allocate the bus request information to the bus request queues on the priority basis; and a second priority-specific allocation unit within the second module group that refers to the table to allocate the bus request information to the bus request queues on the priority basis.

14. A method comprising:
determining, using an arbitration circuit, inter-buffer memory data transfer from one of two modules among a plurality of modules coupled to a bus, to another of the two modules as permitted data transfer based on a priority set therefor,
wherein respective modules of the plurality of modules comprise a buffer memory, wherein the arbitration circuit permits respective modules of the plurality of modules to use the bus in response to a bus request received from the plurality of modules, and wherein the plurality of modules comprise a plurality of ASIC modules for printing that function as co-processors for the processor, a plurality of ASIC modules for the scanner that function as co-processors for the processor, and a processor interface module that is coupled to the processor and functions as a transfer buffer between the processor and the bus;

allocating a permission time slot, in which the bus request for the inter-buffer memory data transfer is permitted, to each of a first module group including the processor interface module and the plurality of ASIC modules for printing and a second module group including the processor interface module and the plurality of ASIC modules for the scanner, in each of a first multi-operation in which a print function and an image scan function are operated in parallel and a second multi-operation in which a copy function and the image scan function are operated in parallel;

alternately setting the permission time slot allocated to the first module group and the permission time slot allocated to the second module group in one of the first multi-operation and the second multi-operation; and permitting the bus request for the inter-buffer memory data transfer within the first module group in the permission time slot allocated to the first module group, and permit the bus request for the inter-buffer memory data transfer within the second module group in the permission time slot allocated to the second module group, the permission time slot being defined so that a value obtained by dividing the permission time slot allocated to the first module group by the permission time slot allocated to the second module group is larger in the first multi-operation than in the second multi-operation.

15. The method according to claim 14,
wherein the arbitration circuit comprises bus request queues, wherein respective bus request queues of the bus request queues are associated with a priority-basis, and
wherein the method further comprises extracting bus request information from one of the bus request queues based on a priority threshold, in response to a change to an inactive state for a bus busy signal indicating that the inter-buffer memory data transfer is being performed.

16. The method according to claim 14, wherein the bus request information comprises a transfer size and an inter-buffer memory transfer ID that specifies the two modules for which the inter-buffer memory data transfer is to be performed.

17. The image forming apparatus according to claim 14, wherein the arbitration circuit further comprises:
a table associating the inter-buffer memory transfer ID with the priority;

a first priority-specific allocation unit within the first module group that refers to the table to allocate the bus request information to the bus request queues on the priority basis; and a second priority-specific allocation unit within the second module group that refers to the table to allocate the bus request information to the bus request queues on the priority basis.

* * * * *